United States Patent [19]
Shreckhise

[11] 3,990,400
[45] Nov. 9, 1976

[54] POULTRY COOP WITH SELF-DUMPING SIDE DOOR

[76] Inventor: George W. Shreckhise, P.O. Box 92, Weyers Cave, Va. 24486

[22] Filed: Apr. 25, 1975

[21] Appl. No.: 571,697

[52] U.S. Cl. .................................... 119/19; 217/57
[51] Int. Cl.² .......................................... A01K 1/02
[58] Field of Search ................. 119/19, 12, 18, 17, 119/82, 21, 22; 217/57, 42, 60 E

[56] References Cited
UNITED STATES PATENTS

| | | | |
|---|---|---|---|
| 1,144,881 | 6/1915 | Vollmer et al. | 217/57 |
| 2,109,902 | 3/1938 | Hatch et al. | 217/57 |
| 3,095,992 | 7/1963 | Shreckhise | 217/57 |
| 3,621,818 | 11/1971 | Johnston et al. | 119/17 |

Primary Examiner—Hugh R. Chamblee
Assistant Examiner—Peter K. Skiff
Attorney, Agent, or Firm—Sherman Levy

[57] ABSTRACT

A poultry coop is provided for use in locations such as plants that are adapted to handle large quantities of poultry. The coop is constructed so that the side door is normally maintained in a closed or latched position, and wherein when the coop is tilted, the weight of the poultry therein will be sufficient to cause the side door to automatically swing open whereby the poultry will be discharged onto a desired area or location.

2 Claims, 10 Drawing Figures

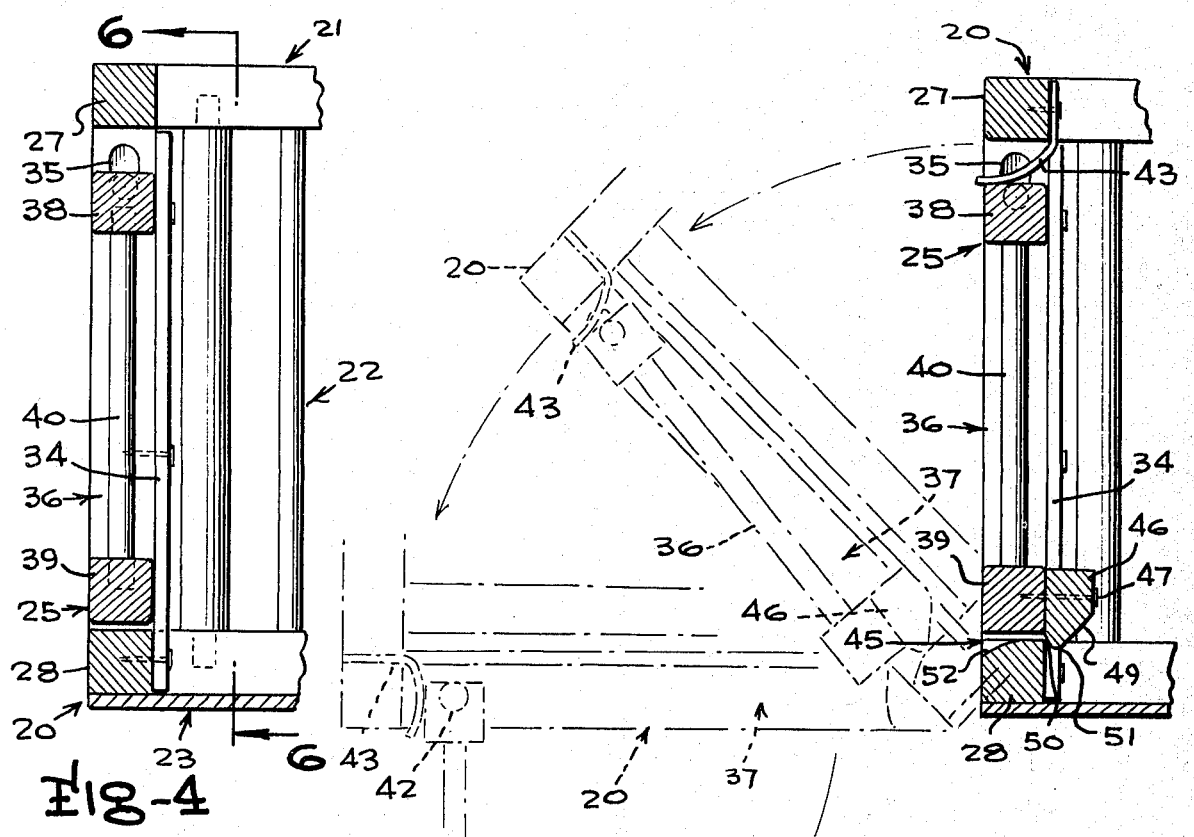
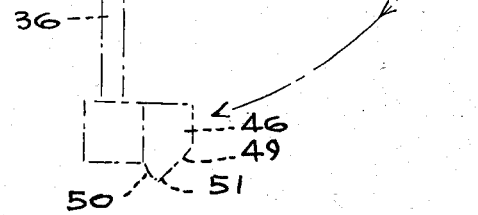
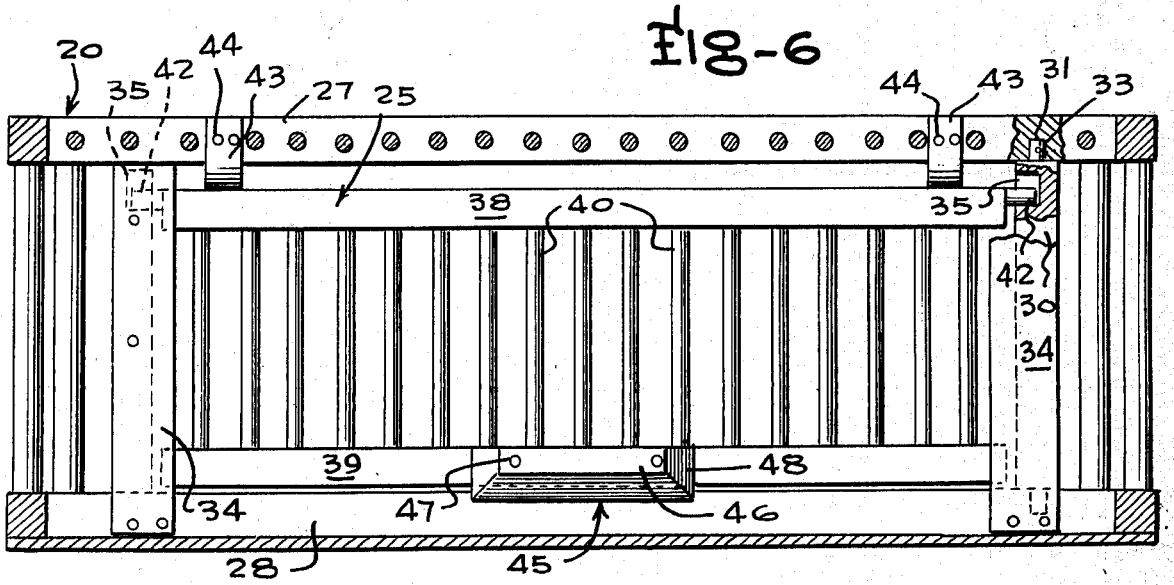

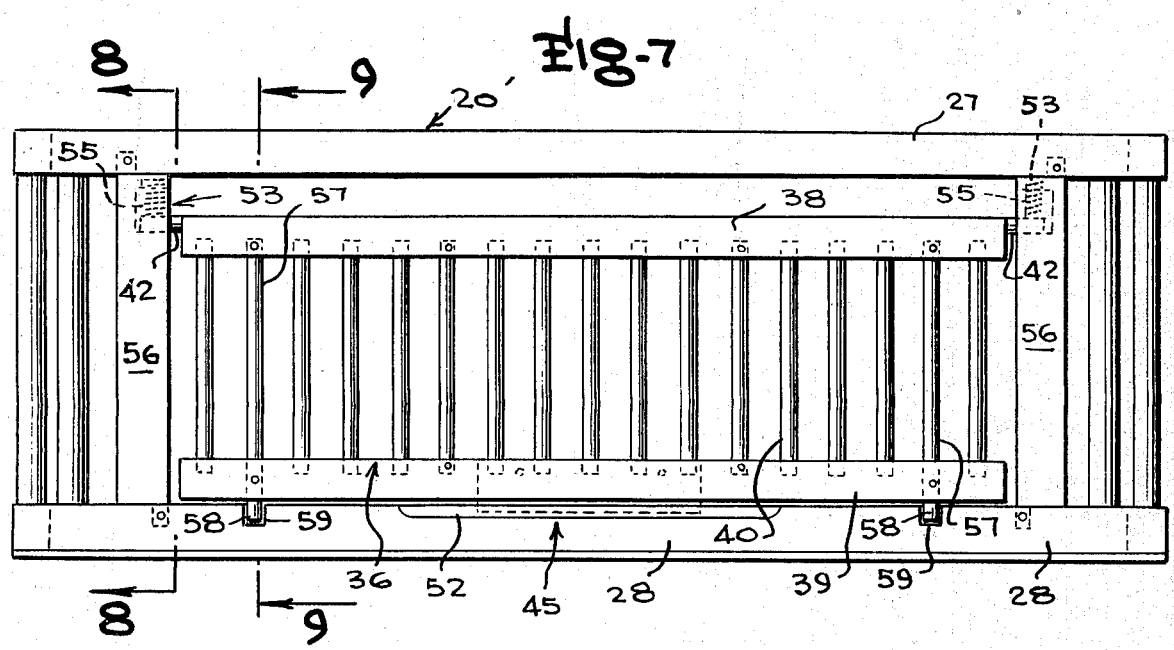
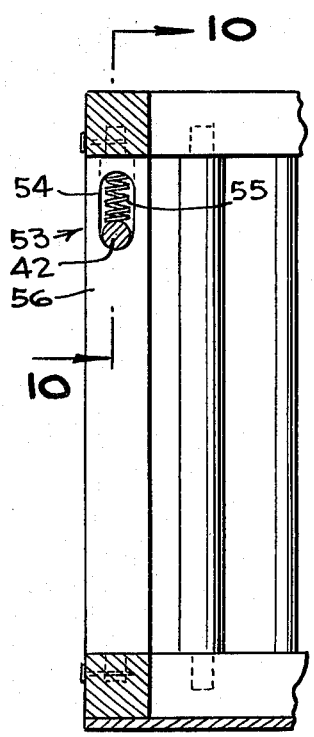
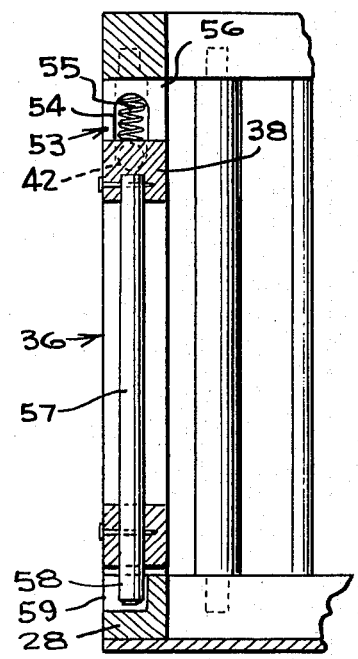
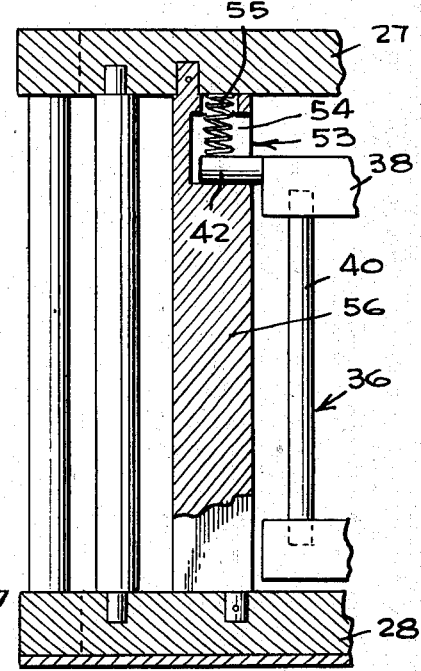
Fig-7
Fig-8  Fig-9  Fig-10

3,990,400

POULTRY COOP WITH SELF-DUMPING SIDE DOOR

BACKGROUND OF THE INVENTION

Field of the Invention

The present invention relates to poultry coops for handling poultry or fowl such as chickens and the like and wherein the coops are provided with self-dumping side doors that will automatically open when the coops are tilted so that the poultry therein can be automatically discharged onto a desired unit or zone. After the poultry has been discharged, the coops can be returned from their tilted position so that the door will be able to be readily moved to its normal closed position so that the coop can be used over and over again for such purposes. The poultry coop of the present invention is especially suitable for use in automated plants and wherein there will result in improved efficiency as well as minimizing costs in the handling of such poultry.

In addition, the poultry can be handled with less likelihood of bruising the poultry. The poultry coop with the self-dumping side door has a pressure means arranged in engagement therewith for normally biasing or urging the door downwardly, and there is also provided a cam latching mechanism for selectively retaining or maintaining the door in closed position.

SUMMARY OF THE INVENTION

A poultry coop with self-dumping side door is provided wherein the door is retained in its closed position until the coop is tilted, as for example, when the coops are moving along a conveyor or the like and wherein, when the coops are tilted, the weight of the poultry therein will cause the door to be automatically opened in the side of the coops so that the poultry can be automatically discharged from the tilted coop.

There is further provided other important features such as the cam latching means that functions in cooperation with the pressure means so that the door will be held closed until the coop is tilted, and wherein the cam latching means is constructed so that after the coop has been emptied of poultry, the door can be readily moved or returned to its closed position.

The primary object of the present invention is to provide a poultry coop with self-dumping side door that has improved characteristics and advantages as compared to previous poultry coops.

Still another object of the present invention is to provide a poultry coop that is ruggedly constructed and efficient to use and which is relatively simple and inexpensive to manufacture.

Other objects and advantages of the present invention will become apparent in the following specification when considered in the light of the attached drawings.

BRIEF DESCRIPTION OF THE DRAWINGS

FIG. 4 is a sectional view taken on the line 4—4 of FIG. 2.

FIG. 5 is a view generally similar to FIG. 4 but illustrating the movement of the parts when the coop is tilted whereby the side door automatically opens.

FIG. 6 is a sectional view taken on the line 6—6 of FIG. 4.

FIG. 7 is a side elevational view of a modified or alternative poultry coop with self-dumping side door wherein a different pressure exerting means is provided as well as a different type of limit stop means for the door.

FIG. 8 is a sectional view taken on the line 8—8 of FIG. 7.

FIG. 9 is a sectional view taken on the line 9—9 of FIG. 7.

FIG. 10 is a sectional view taken on the line 10—10 of FIG. 8.

DESCRIPTION OF THE PREFERRED EMBODIMENT

Figure 1:
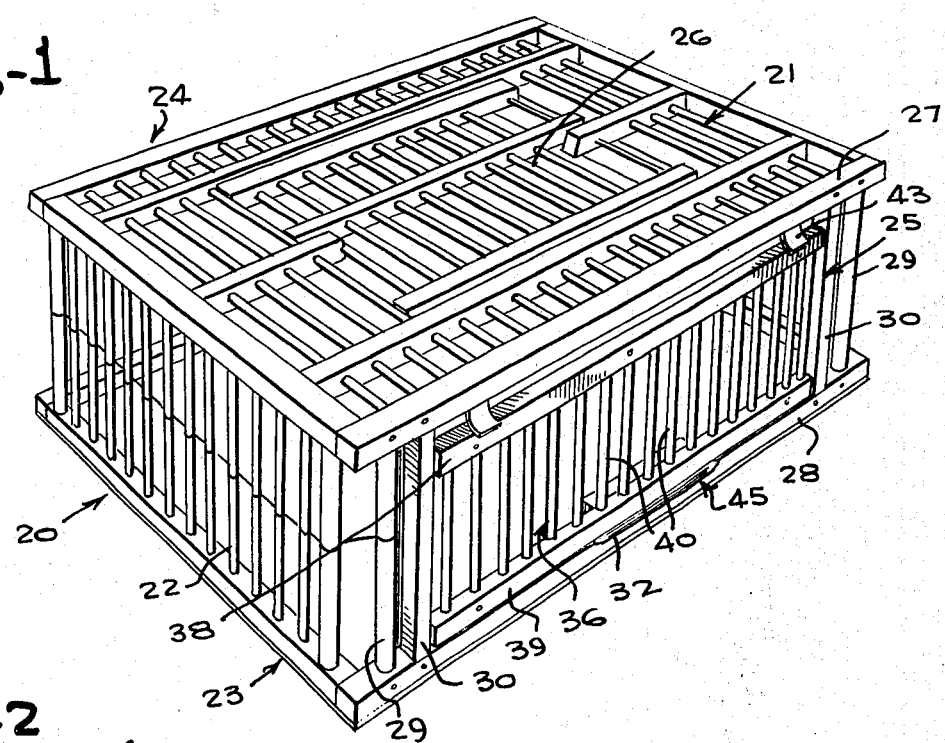
FIG. 1 is a perspective view of the poultry coop with self-dumping side door constructed in accordance with the present invention.
Figure 2:
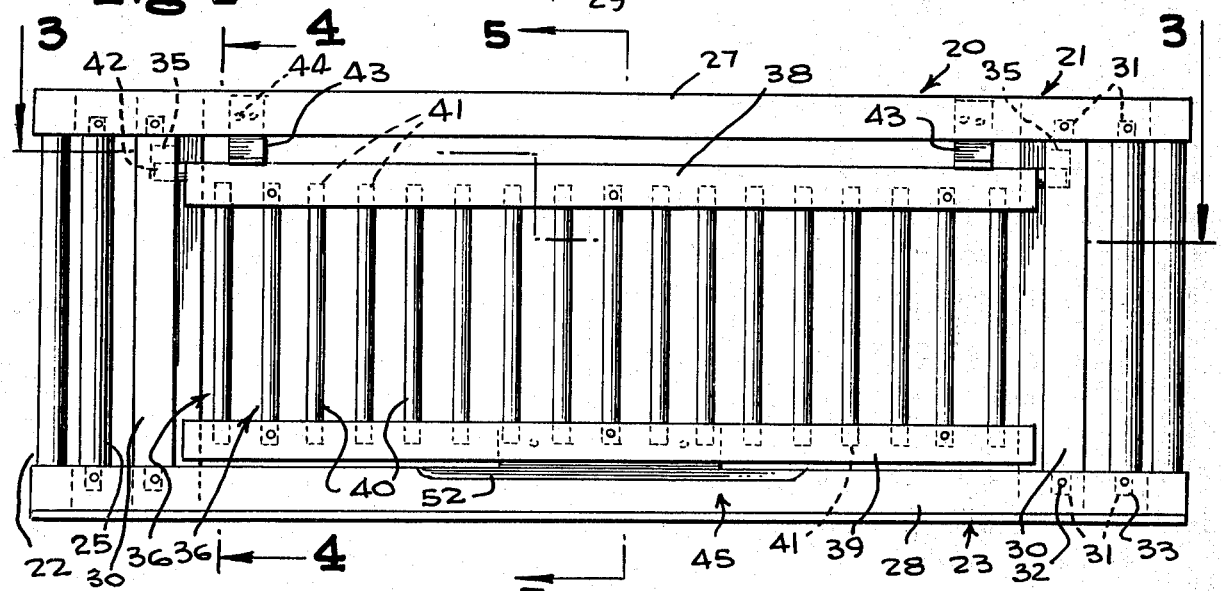
FIG. 2 is a side elevational view thereof.
Figure 3:
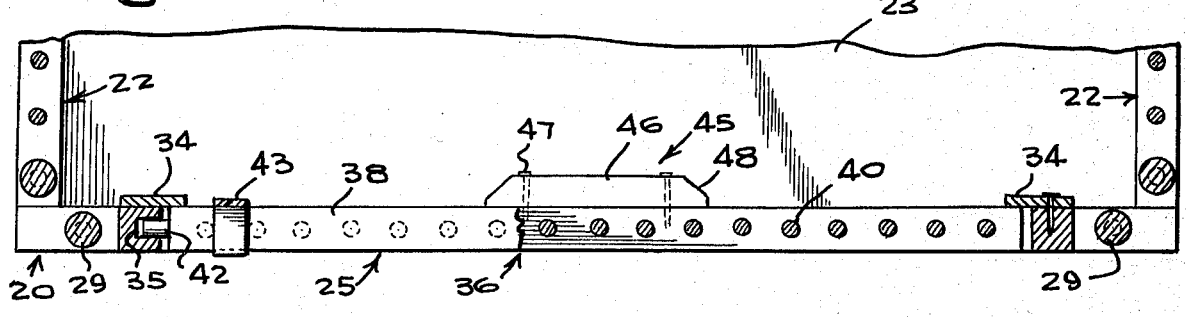
FIG. 3 is a sectional view taken on the line 3—3 of FIG. 2.

Referring in detail to the drawings and more particularly to FIGS. 1–6 of the drawings, the numeral 20 indicates a poultry coop constructed in accordance with the present invention. The poultry coop 20 includes a top 21, ends 22, a bottom 23, and sides 24 and 25. The top 21 has a closure 26 that can be opened so that poultry can be loaded into the coop 20.

As shown in the drawings, the side 25 includes a pair of spaced parallel top and bottom rails 27 and 28. Cylindrical posts 29 extend between the rails 27 and 28 and are secured thereto. Vertically disposed bars of rectangular formation are spaced inwardly from the posts 29, and the bars 30 are arranged as shown in the drawings. Reduced diameter end portions 31 are provided on the ends of the bars 30 and posts 29, and these reduced diameter end portions 31 are snuggly seeded in recesses 33 in the rails so that the parts will be maintained in their proper position. Suitable securing elements such as nails 32 can be provided for maintaining the parts secured together in their assembled formation.

Stop pieces 34 are secured to the rear surfaces of the bars 30, and these stop pieces 34 may also be secured to the lower rail 28 by nails or the like.

Vertically disposed grooves or slots 35 are provided in the inner surfaces of the bars 30 adjacent their upper ends, for a purpose to be later described. The numeral 36 indicates a self-dumping side door that is mounted for movement into and out of opened and closed relation with respect to an opening 37 in the side 25 of the coop 20. The door 36 includes a pair of spaced parallel horizontally disposed upper and lower cross pieces 38 and 39, and a plurality of spaced parallel vertically disposed dowels 40 extend between the cross pieces 38 and 39, there being recesses 41 in the cross pieces 38 and 39 for snuggly receiving the ends of the dowels 40. Nails can be used for maintaining these parts secured together. Pins 42 are provided on the outer ends of the upper cross piece 38, and the pivot pins 42 are off-set with respect to the cross pieces 38. The pivot pins 42 being freely mounted in the slots 35, FIG. 3.

Pressure exerting means or members are provided for normally biasing the door 36 downwardly, and, as shown in FIGS. 1–6, these pressure members consist of at least one bendable strip 43 that is secured as by securing elements 44 to the upper rail 27. The lower free portions of the strips 43 engage and exert pressure on the upper cross piece 38 of the door 36.

There is further provided a cam latching means for the door 36, and this cam latching means is indicated generally by the numeral 45. The cam latching mechanism 45 includes a block 46 that is secured to the inner surface of the lower cross piece 39 as at 47. The block or body piece 46 includes inclined end portions 48. As shown in FIG. 5, the block 46 also includes a beveled cam surface 49 as well as a beveled cam surface 50 so that there is defined or provided on the lower portion of the block a tip or edge 51 that projects slightly below the lower surface of the cross piece 39. The intermediate portion of the lower rail 28 is beveled slightly as at 52 so that the camming action can take place in a desired manner.

As shown in FIG. 5, when the coop is in its normal or upright position, the door 36 is in latched position. But when the coop is tilted from the solid line position of FIG. 5 to the broken line position of FIG. 5, the door 36 will automatically open due to the pressure of the poultry in the coop so that the poultry will be automatically discharged from the coop onto a desired location.

Attention is directed to FIGS. 7—10 of the drawings wherein there is illustrated a slightly modified coop that is indicated generally by the numeral 20', and the coop 20' has generally the same construction as the coop 20 of FIGS. 1-6 except that the coop 20' has a different pressure exerting means as well as a different limit stop means for limiting inward movement of the door.

In FIGS. 7-10, the numeral 53 indicates the pressure exerting means for the door 36 and wherein the pressure exerting means 53 consists of recesses or chambers 54 that are formed in the upper ends of the bars 56. The upper edges of the coil springs 55 abutt the lower surface of the rail 27, and the lower ends of the springs 55 engage the upper surfaces of the pivots pins 42 so that the proper amount of pressure will be exerted on the door 36.

In addition, in FIGS. 7-10, there is shown a modified or alternative limit stop means for limiting inward movement of the door 36. Thus, instead of using the limit stop pieces 34, there is provided elongated dowels 57. Certain of these dowels 57 are of a greater length than the distance between the cross pieces 38 and 39 so that there is provided projecting portions 58 that are adapted to engage recessed or shouldered portions 59 in the lower rail 28 as shown in FIG. 9 whereby inward swinging or pivotal movement of the door 36 is controlled or limited. The coop 20' is adapted to use a cam latching means 45 similar to that described in detail in connection with coop 20 of FIGS. 1—6.

From the foregoing, it will be seen that there has been provided a poultry coop with a self-dumping side door. In use, with the parts arranged as shown in the drawings, and in particular as is shown in FIGS. 1-6, the coop 20 is adapted to be loaded with poultry such as chickens by opening the closure 26 so that the poultry can be placed inside the coop 20. Then the closure 26 is returned to its closed position as shown in FIG. 1.

The coops are especially suitable for use in plants or establishments where it is desired to automatically empty the coops. For this purpose, the coops are provided with the self-dumping side doors 36. As shown in FIG. 5, the door 36 is normally in a closed position. But when the coop is tilted or moved from the solid line position of FIG. 5 to the broken line position of FIG. 5, the weight of the poultry in the coop will exert sufficient pressure against the door 36 so that the holding force of the pressure members 43 and the latching mechanism 45 will be overcome whereby the door 36 can automatically swing open or pivot about an axis extending through the pivot pins 42 whereby the opening 37 in the side of the coop will be exposed so that the poultry can be automatically dropped from the coop through the opening 37 onto the desired area or zone.

After the coop has been emptied of poultry, the coop is returned to its normal position. That is, the coop is returned from a position such as that shown in broken lines of FIG. 5 to the solid line position of FIG. 5; and by exerting slight manual pressure on the door 36, the door can be latched or locked in place until it is ready to be used again in the same manner.

It is to be noted that the coops 20 generally have a construction similar to that shown in prior U.S. Pat. Nos. 3,127,043 and 3,095,992 except that there is provided the self-dumping side door for the coop.

The door 36 is swively or pivotally mounted by means of the pins 42 that are arranged in the slots 35, and the slots 35 are sufficiently large to provide clearance for the door 36 to rise up or down slightly so that the door can effectively open or close. In addition, one or more strips 43 are provided and these strips 43 are adapted to be made of a bendable material such as a suitable somewhat rigid plastic material. These strips 43 exert sufficient pressure downwardly on the door 36 so that the door will operate in the desired manner.

Also, the cam latching means 45 includes the block 46 that has the cam surfaces 49 and 50 as well as the tip 51. It will be seen in FIG. 5 that when the door 36 is in a closed position the lower edge of the tip 51 protrudes slightly downward below the lower edge of the cross piece 39 so that the tip 51 will function as a latch to retain the door 36 in closed position. However, when the coop is tilted, the weight of the poultry in the coop will be sufficient to cause the beveled surface 50 to ride over the adjacent portion of the rail 28, and the strips 43 can flex sufficiently so that the door 36 can open. Similarly, when the door is being moved to its closed position, the bevels or cams surface 49 will co-act with the beveled surface 52 to permit easy closing of the door 36.

Instead of using the strips 43, the pressure means 53 shown in FIGS. 7-10 can be used and wherein the pressure means 53 includes the coil springs 55 that bear against the pins 42 to exert the proper pressure.

The coop of FIGS. 1-6 includes stop members 34 that serve to limit inward movement of the door 36. In FIGS. 7-10, the door 36 uses a different limit stop means that consists of recesses 59 that are formed in the lower rail 28. These recesses 59 provide shoulders for receiving the lower projecting end portions 58 of the dowels 57 so that inward swinging movement of the door 36 is controlled or limited. Otherwise, the function or use of the coop 20' shown in FIGS. 7-10 is generally the same as that described in connection with FIGS. 1-6. That is, the coop 20' includes the self-dumping side door that automatically opens when the coop is tilted to permit automatic dumping of the poultry.

The parts can be made of any suitable material and in different shapes and sizes as desired or required.

The self-dumping poultry coop of the present invention has generally the same construction as that shown in my prior patents except that there is provided the new type of self-dumping side door. The coop is ruggedly constructed and permits large quantities of poultry to be handled with a minimum cost. If any of the parts break, they can be readily replaced. The poultry coop with the self-dumping side door speeds up cooping operation and eliminates costly bruising and functions in a fool-proof manner. Also, the coop will provide generally trouble-free service. The side door will drop or open with very little weight applied thereto.

The present invention is especially suitable for use when loading poultry coops and the like on pallets and when placing coops on or off trucks since the doors will automatically open when the coops are tilted to permit the chickens or other poultry to be automatically discharged. The pressure applying members 43 or 53 in conjunction with the latching means 45 is an improvement over prior devices such as those using magnets.

The various posts or other parts can be mortised or otherwise formed, and just sufficient pressure is applied to the door to hold it in place. The parts such as the slots 35 for the pins 42 provide sufficient clearance to permit the door to move. The number of strips 43 can be varied as desired or required.

The present invention is especially suitable for use in handling coops on loading docks and wherein the door on the side of the coop facilitates dock unloading. Thus, as the coops are tilted down onto a conveyor, the door will open so that the bird will drop onto a member such as a conveyor below the coop and the bird or poultry will fall gently onto the desired location. The poultry will have less bruises than they would with hand unloading. Also, a plurality of the coops can be unloaded in a very short period of time. Thus, the coops can be used with dock handling systems that handle live poultry and wherein such dock handling systems automatically convey, unload the poultry from the coops, and transport the poultry to a hanging cage or the like.

As shown in FIG. 5, the coops are rotated or tilted 90°, and the coops will permit important savings in cost of labor and the like. The coops can be used with pallets so that the coops are convenient to use with automatic dock coop unloading systems and the like.

Additional embodiments of the invention in this specification will occur to others and, therefore, it is intended that the scope of the invention be limited only by the appended claims and not by the embodiments described hereinabove. Accordingly, reference should be made to the following claims in determining the full scope of the invention.

What is claimed is:

1. As a new article of manufacture, a poultry coop comprising a top, bottom, ends and a side, said top having an opening therein, a closure mounted for movement into and out of opened and closed relation with respect to said opening, a door swingably connected to said side, said side including a pair of spaced parallel top and bottom horizontally disposed rails, cylindrical posts extending between said rails, reduced diameter dowels on the ends of said posts, there being recesses in said rails for receiving said dowels, vertically disposed bars spaced inwardly from said posts and said bars being interposed between said upper and lower rails, there being an opening in said side, said door including upper and lower spaced parallel cross pieces, a plurality of dowels having their ends connected to said cross pieces, pins on the ends of the upper cross piece, there being slots in said bars for receiving said pins, at least one yieldable strip secured to the upper rail and having its lower portion engaging and exerting pressure on the upper cross piece of the door, and a cam latching means for said door, said cam latching means comprising a block secured to the inner surface of the lower cross piece, said block having beveled cam surfaces and a lower tip, said tip projecting slightly below the lower edge of the lower cross piece, said lower rail having a slightly curved surface for co-action with the beveled surfaces of the block and whereby upon tilting of the coop, the door in the side thereof will open to permit discharge of poultry from the coop, and stop pieces secured to said bars for limiting movement of the door.

2. In a poultry coop, a side having an opening therein, a door mounted for movement into and out of opened and closed relation with respect to said opening, said side including upper and lower horizontally disposed spaced parallel rails, vertically disposed bars and posts extending between said rails and secured thereto, there being recesses in the upper portions of said bars, pressure means comprising coil springs seeded in said recesses, pivot pins on the ends of said door engaging said recesses and said pivot pins being engaged by said coil springs, said door including upper and lower cross pieces having dowels extending there between, there being a beveled surface on the intermediate portion of the lower rail, certain of said dowels being of greater length than the distance between the said cross pieces so that a lower end portion of these dowels projects downwardly beyond the lower cross piece, there being grooves in said lower rail for receiving the lower projecting end portions of the dowels to define limit stops, and cam latching means including a block secured to said door and said block having inclined cam surfaces for co-action with the beveled surface on the lower rail.

* * * * *